No. 691,022. Patented Jan. 14, 1902.
J. C. TUNNICLIFF.
CULTIVATOR.
(Application filed Sept. 7, 1901.)
(No Model.)
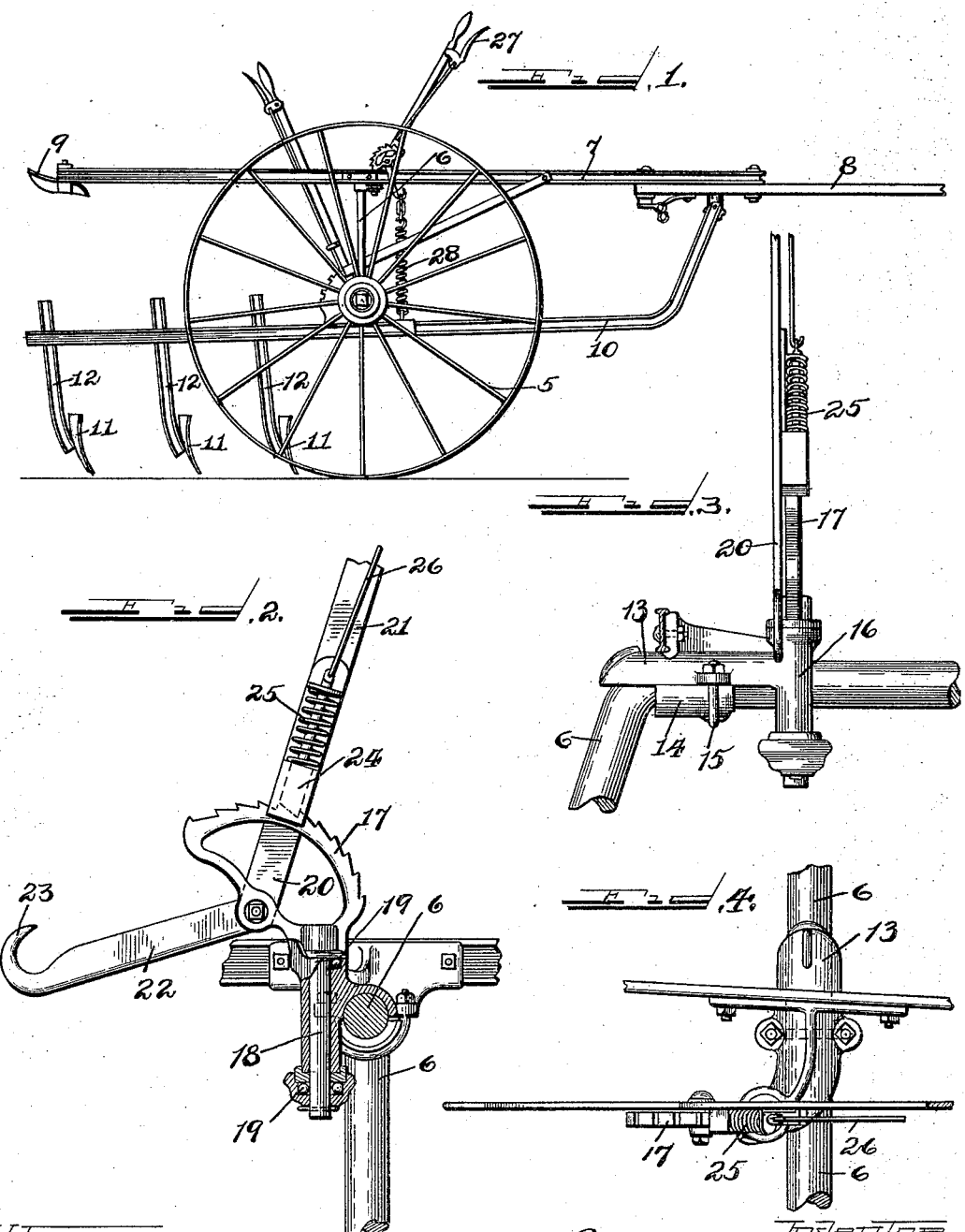
Witnesses
Ira D. Perry
J B Weir
Inventor
John C. Tunnicliff
by Bond, Adams, Pickard & Jackson
his Attys

UNITED STATES PATENT OFFICE.

JOHN C. TUNNICLIFF, OF MOLINE, ILLINOIS, ASSIGNOR TO D. M. SECHLER CARRIAGE COMPANY, OF MOLINE, ILLINOIS, A CORPORATION OF ILLINOIS.

CULTIVATOR.

SPECIFICATION forming part of Letters Patent No. 691,022, dated January 14, 1902.

Application filed September 7, 1901. Serial No. 74,603. (No model.)

*To all whom it may concern:*

Be it known that I, JOHN C. TUNNICLIFF, a citizen of the United States, residing at Moline, in the county of Rock Island and State of Illinois, have invented certain new and useful Improvements in Cultivators, of which the following is a specification, reference being had to the accompanying drawings.

My invention relates to improvements in wheeled cultivators, and its object is to provide a new and improved means by which the cultivator-beams may be lifted from the ground or the depth of the shovels in the ground varied and from which the cultivator-beams are so suspended that when they are swung laterally to laterally vary the path of the shovels in the ground they will swing in a horizontal plane, and the depth at which the shovels engage with the ground will not be varied when the path of their travel is shifted laterally for any reason. I accomplish this object as hereinafter specified, and as illustrated in the drawings.

In the drawings, Figure 1 is a side elevation of a cultivator. Fig. 2 is an enlarged detail, being a side elevation of the lifting-lever, showing its pivotal connection with the frame. Fig. 3 is an enlarged detail, being a front view of the parts shown in Fig. 2; and Fig. 4 is an enlarged detail, being a top or plan view of the same parts shown in Figs. 2 and 3.

Referring to the drawings, 5 indicates the wheels of the cultivator, which are journaled in any approved way upon the arched axle 6, which may be of any approved construction.

7 indicates beams which are supported upon the axle 6 and form a portion of the frame of the cultivator and at their forward ends by means of the usual framework support a tongue 8.

9 indicates the seat, which is suspended from the rear ends of the seat-beam 7.

10 indicates the cultivator-beams, which are pivotally connected at their forward ends to the forward ends of the beams 7 in such a way that they may swing vertically for the purpose of varying the depth of the shovels in the ground or raising them entirely from the ground and also may swing laterally for the purpose of varying laterally the path of the shovels in the ground. The cultivator-beam 10 is provided with shovels 11, supported on shanks 12 in any well-known and approved manner.

13 indicates a sleeve, which is secured, by means of a clip 14 and clip-bolts 15, to the axle 6, so as to be firmly secured thereto. The sleeve 13 is provided with a socket 16, carried vertically on said sleeve.

17 indicates a segmental rack, which is provided with a pin 18, which is preferably formed integral therewith. The pin 18 is journaled in the socket 16 so as to revolve freely therein, and is preferably provided at each end with ball-bearings 19.

20 indicates a lever which is pivoted upon the segmental rack 17 and is provided with a long arm 21 and a shorter arm 22. The arm 22 is provided with a hook 23 at its end for the purpose of engaging the spiral-spring-suspending device hereinafter described. The longer arm 21 of the lever 20 is provided with the usual dog 24, spring 25, connecting-rod 26, and hand-lever 27 for the purpose of engaging the lever 20 with the segmental rack 17 and locking it at any desired position thereto.

28 indicates a spiral spring, one end of which is hooked over the hook 23 and the other end connected with the cultivator-beam 10. In place of the spiral spring 28 of course any other approved form of connection between the lever and the cultivator-beam may be used.

In the elevation, Fig. 1, only one of the cultivator-beams and one of the levers for lifting the same appear. It is of course understood, however, that the cultivator-beam and the corresponding lifting-lever are duplicated upon each side of the machine in the ordinary manner.

I have shown the devices applied to a riding-cultivator; but of course it is obvious that they may be applied to any wheeled cultivator, whether a riding or walking cultivator.

That which I claim as my invention, and desire to secure by Letters Patent, is—

1. In a cultivator, the combination with wheels, an arched axle journaled in said wheels, a frame supported by said arched axle, and a cultivator-beam pivotally suspended at its forward end from said frame, of a vertical socket mounted on said arched axle, a segmental rack provided with a pin journaled in said socket and revoluble therein, a lever pivoted upon said segmental rack, and a flexible connection between said lever and said cultivator-beam, substantially as described.

2. In a cultivator, the combination with wheels, an arched axle journaled in said wheels, a frame supported by said arched axle, and cultivator-beams pivotally suspended at their forward ends from said frame, of sleeves removably secured to said arched axle, a socket secured to each of said sleeves and vertically secured to said arched axle by means of said sleeves, segmental racks provided each with a pin, journaled in said sleeves and revolubly mounted therein, a lever pivoted upon each of said segmental racks, and flexible connections between said levers and said cultivator-beams, substantially as described.

JOHN C. TUNNICLIFF.

Witnesses:
MORRIS GEISMAR,
J. H. SAMUELS.